(12) United States Patent
Otanez et al.

(10) Patent No.: US 9,090,241 B2
(45) Date of Patent: Jul. 28, 2015

(54) SYSTEM AND METHOD FOR CONTROLLING AN AUTOMATIC STOP-START

(71) Applicant: GM Global Technology Operations LLC, Detroit, MI (US)

(72) Inventors: Paul G. Otanez, Troy, MI (US); Craig S. Ross, Ypsilanti, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 68 days.

(21) Appl. No.: 13/963,107

(22) Filed: Aug. 9, 2013

(65) Prior Publication Data

US 2014/0088842 A1  Mar. 27, 2014

Related U.S. Application Data

(60) Provisional application No. 61/704,844, filed on Sep. 24, 2012.

(51) Int. Cl.
| | |
|---|---|
| *G06F 7/00* | (2006.01) |
| *B60W 10/02* | (2006.01) |
| *B60W 10/06* | (2006.01) |
| *B60W 10/115* | (2012.01) |
| *B60W 30/18* | (2012.01) |
| *F16H 61/00* | (2006.01) |

(52) U.S. Cl.
CPC .............. *B60W 10/02* (2013.01); *B60W 10/06* (2013.01); *B60W 10/115* (2013.01); *B60W 30/18018* (2013.01); *F16H 61/0021* (2013.01); *Y10T 477/26* (2015.01); *Y10T 477/641* (2015.01); *Y10T 477/75* (2015.01)

(58) Field of Classification Search
CPC ................... F02N 2200/061; F02N 2200/064; F02N 2200/122; F02N 11/0818; F02N 11/0803; F02N 11/0814; B60W 10/02; B60W 10/023; B60W 10/026; B60W 10/04; B60W 10/06; B60W 10/08; B60W 2510/0291; B60W 2510/107; B60W 2510/1075; B60W 2510/108; B60W 2510/1085; B60W 2710/1072; B60W 2710/1077; B60W 2710/1083; B60W 2710/1088; B60W 2510/0657; B60W 10/115; B60W 30/18018; F16H 61/0021; Y10T 477/26; Y10T 477/27; Y10T 477/32; Y10T 477/6403; Y10T 477/6407; Y10T 477/6418; Y10T 477/65; Y10T 477/653; Y10T 477/669; Y10T 477/6745; Y10T 477/6895; Y10T 477/6937; Y10T 477/69393

See application file for complete search history.

(56) References Cited

U.S. PATENT DOCUMENTS

| | | | |
|---|---|---|---|
| 6,074,320 A | 6/2000 | Miyata et al. | |
| 6,396,165 B1 * | 5/2002 | Nagano et al. | ................ 307/10.6 |
| 6,832,148 B1 * | 12/2004 | Bennett et al. | .................. 701/54 |
| 8,056,666 B2 | 11/2011 | Portell et al. | |
| 8,069,661 B2 | 12/2011 | Hendrickson | |
| 8,277,205 B2 | 10/2012 | Mellet et al. | |
| 8,375,710 B2 | 2/2013 | Mellet et al. | |

(Continued)

FOREIGN PATENT DOCUMENTS

| | | |
|---|---|---|
| DE | 102006041899 A1 | 3/2008 |
| WO | WO2007118500 A1 | 10/2007 |

*Primary Examiner* — David D Le (57) ABSTRACT

A system and method are provided for controlling an automatic engine stop-start in conjunction with a transmission having one or more latching valves. The system and method is configured to determine whether conditions are met for an autostop, and if so, to latch or unlatch the latching valve(s) by changing clutch pressure.

19 Claims, 3 Drawing Sheets

(56) References Cited

U.S. PATENT DOCUMENTS

| | | | |
|---|---|---|---|
| 8,382,626 B2 | 2/2013 | Moorman et al. | |
| 8,387,665 B2 | 3/2013 | Lundberg et al. | |
| 8,556,765 B2 | 10/2013 | Bockenstette | |
| 8,561,640 B2 | 10/2013 | McConnell et al. | |
| 8,585,548 B2 | 11/2013 | Zhang et al. | |
| 8,591,381 B2 | 11/2013 | Zhang et al. | |
| 2003/0148850 A1* | 8/2003 | Tomohiro et al. | 477/3 |
| 2003/0171868 A1* | 9/2003 | Morishita et al. | 701/54 |
| 2008/0060862 A1 | 3/2008 | Schiele et al. | |
| 2009/0247355 A1* | 10/2009 | Tryon et al. | 477/52 |
| 2010/0071357 A1 | 3/2010 | Lundberg et al. | |
| 2010/0282020 A1 | 11/2010 | Greenwood et al. | |
| 2011/0139285 A1 | 6/2011 | Lundberg et al. | |
| 2011/0295474 A1 | 12/2011 | Ma et al. | |
| 2011/0295483 A1 | 12/2011 | Ma et al. | |
| 2011/0295489 A1 | 12/2011 | Ma et al. | |
| 2011/0295494 A1* | 12/2011 | Ma et al. | 701/112 |
| 2011/0295495 A1 | 12/2011 | Ma et al. | |
| 2011/0320076 A1* | 12/2011 | Shin | 701/22 |
| 2012/0088630 A1* | 4/2012 | Zhang et al. | 477/52 |
| 2012/0088631 A1 | 4/2012 | Zhang et al. | |
| 2012/0088632 A1 | 4/2012 | Zhang et al. | |
| 2012/0192826 A1 | 8/2012 | Shafto | |
| 2012/0312277 A1 | 12/2012 | Santoso et al. | |
| 2013/0035839 A1* | 2/2013 | Otanez et al. | 701/102 |
| 2013/0116898 A1* | 5/2013 | Lundberg et al. | 701/54 |
| 2013/0145756 A1 | 6/2013 | Otanez et al. | |
| 2013/0232962 A1 | 9/2013 | Marin et al. | |
| 2013/0233396 A1 | 9/2013 | Lee et al. | |
| 2013/0263584 A1 | 10/2013 | Otanez et al. | |
| 2013/0281253 A1 | 10/2013 | Ross et al. | |
| 2013/0296093 A1 | 11/2013 | Ross et al. | |

\* cited by examiner

SYSTEM AND METHOD FOR CONTROLLING AN AUTOMATIC STOP-START

CROSS-REFERENCE TO RELATED APPLICATIONS

This application claims the benefit of U.S. Provisional Application No. 61/704,844 filed on Sep. 24, 2012. The disclosure of the above application is incorporated herein by reference.

FIELD

The present disclosure relates to a system and method for controlling a vehicle system, and more particularly to a system and method for controlling an automatic stop-start in a transmission having a latching valve.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

In order to increase the fuel economy of motor vehicles, stopping the engine during certain circumstances may be desirable, such as when stopped at a red light or idling, which may improve fuel economy. The engine may also be stopped while the vehicle is in motion for cruising, or if there is another source of torque, such as a motor in the rear axle. However, in certain circumstances, the stopping of the engine is undesirable.

In addition, after the engine has been shut down and has remained off for an extended period of time, the fluid generally tends to drain down from the passages into a transmission sump under the force of gravity. Upon engine restart, the transmission may take an appreciable amount of time to establish pressure before full transmission operation may resume. Quick system recovery, however, is desirable. As such, maintaining pressure in a clutch could aid in quick system recovery, even when line pressure and/or clutch feed pressure is zero or near zero. In other situations, however, clutch pressure should be eliminated, such as when putting a vehicle in reverse.

Accordingly, there is a need for a method of controlling engine stop-starts while maintaining timely shifting and recovery.

SUMMARY

The present disclosure provides a system and method for controlling an automatic engine stop-start in a transmission having one or more latching valves in one or more clutch control circuits.

The system and method may include steps for latching a torque transmitting mechanism and automatically stopping the engine. For example, the system and method may include steps of: determining whether conditions are met for an autostop; sending a message to a controller to allow autostops; determining whether existing transmission line pressure can be increased sufficiently to latch the latching valve and/or whether the engine is operating in the desired RPM range, and if not, sending an engine speed request to increase or change engine revolutions per minute (RPMs); determining whether line pressure has increased to a level sufficient to latch the latching valve, and if not, changing a line pressure command to increase line pressure; determining whether clutch control pressure has increased or changed to a level sufficient to latch the latching valve, and if not, changing a clutch control command to increase clutch control pressure; and updating a latch mechanism status to indicate latch enablement.

The system and method may also include steps for unlatching the torque transmitting mechanism. For example, the system and method may include steps of: determining whether conditions are met for an autostop; sending a message to a controller to inhibit autostops; determining whether existing transmission line pressure needs to be increased/decreased sufficiently to unlatch the latching valve, and if not, changing a line pressure command to increase line pressure; determining whether clutch control pressure has increased to a level sufficient to unlatch the latching valve, and if not, changing a clutch control command to increase clutch control pressure; and updating a latch mechanism status to indicate latch disablement.

In one aspect, which may be combined with or separate from the other aspects described herein, a method of controlling a hydraulic system of a vehicle powertrain having an engine and a transmission is provided. The method includes determining whether conditions are met for an autostop, determining whether a predetermined minimum amount of line pressure is available from a pump to latch a latching valve, determining whether line pressure is at or above the predetermined minimum amount of line pressure to latch the latching valve, determining whether clutch pressure has been increased to a predetermined minimum amount of clutch pressure to latch the latching valve, and updating a latch status to indicate that the latching valve is enabled.

In another aspect, which may be combined with or separate from the other aspects described herein, a hydraulic fluid latching system for a torque transmitting device of a transmission of a motor vehicle having an engine is provided. The hydraulic fluid latching system includes a clutch feed channel configured to provide hydraulic fluid from a pressurized source to a torque transmitting device when the torque transmitting device is engaged and the engine is running. A latching valve connects the clutch feed channel to the torque transmitting device. The latching valve is configured to selectively trap pressurized hydraulic fluid within the torque transmitting device. A control system is included, which has a first control logic configured to determine whether conditions are met for an autostop, a second control logic configured to determine whether a predetermined minimum amount of line pressure is available from a pump to latch the latching valve, a third control logic configured to determine whether line pressure is above the predetermined minimum amount of line pressure to latch the latching valve, a fourth control logic configured to determine whether clutch pressure has been increased to a predetermined minimum amount of clutch pressure to latch the latching valve, and a fifth control logic configured to update a latch status to indicate that the latching valve is enabled.

In yet another aspect, which may be combined with or separate from the other aspects described herein, a method of controlling a hydraulic system of a vehicle powertrain having an engine and a transmission is provided. The method includes a step of determining whether conditions are met for an autostop and a step of sending a message to inhibit autostops. The method also includes a step of determining whether a line pressure command has been changed to increase line pressure to at least a predetermined threshold, and if not, changing the line pressure command to increase line pressure to at least the predetermined threshold. Further, the method includes a step of determining whether a clutch pressure control command has been increased to a predetermined minimum to unlatch a latching valve, and if not, changing the clutch pressure control command to increase clutch pressure to at least the predetermined minimum. The method also includes updating a latch status to indicate that the latching valve is disabled.

Further areas of applicability will become apparent from the description provided herein. This description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
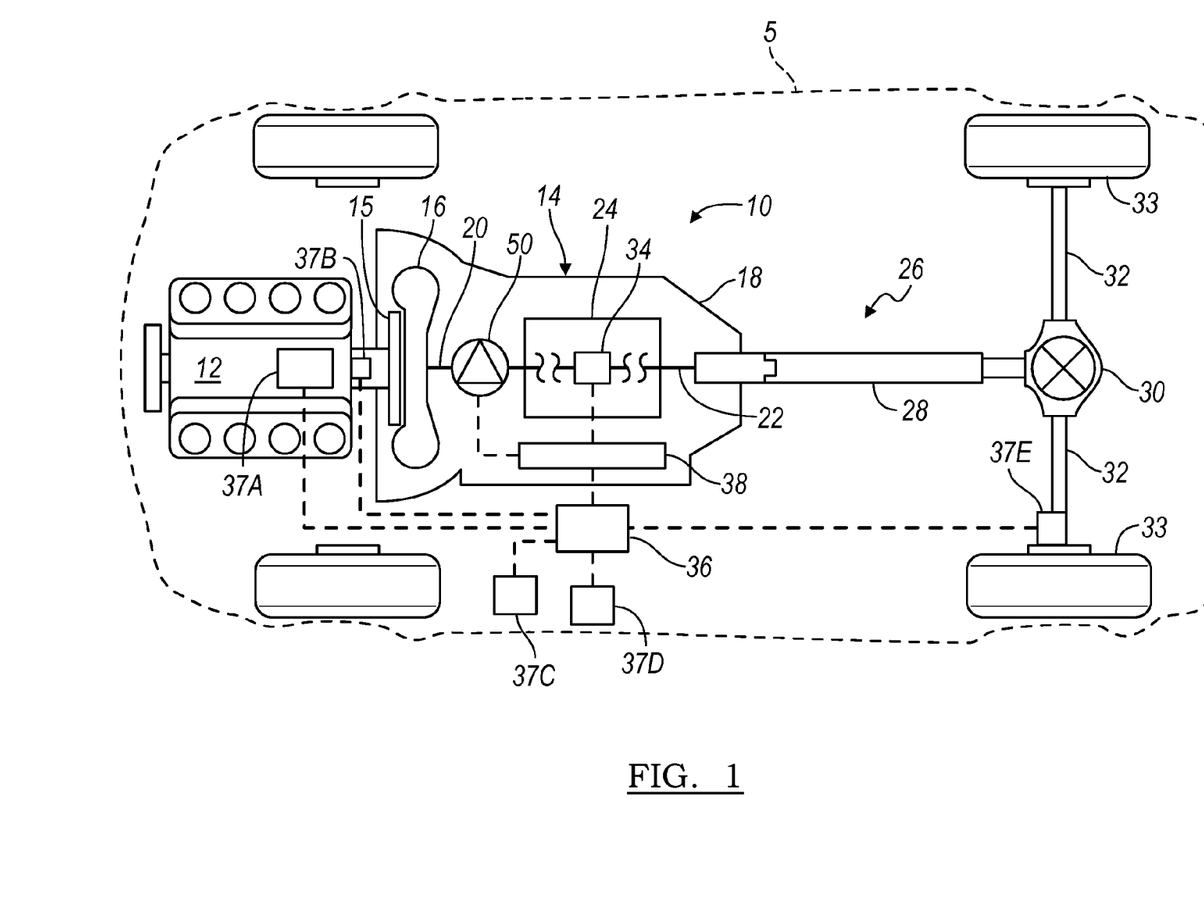
FIG. 1 is a schematic diagram of an exemplary powertrain in a motor vehicle according to the principles of the present invention.

With reference to FIG. 1, a motor vehicle is shown and generally indicated by reference number 5. The motor vehicle 5 is illustrated as a passenger car, but the motor vehicle 5 may be any type of vehicle, such as a truck, van, etc. The motor vehicle 5 includes an exemplary powertrain 10. While a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric motor, or any other type of prime mover, without departing from the scope of the present disclosure. The engine 12 supplies a driving torque to the transmission 14 through a flexplate 15 or other connecting device that is connected to a starting device 16. The starting device 16 may be a hydrodynamic device, such as a fluid coupling or torque converter, a wet or dry clutch, or an electric motor. Alternatively, any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. The specific arrangement and number of the gear sets, clutches/brakes 34, and shafts within the transmission 14 may vary without departing from the scope of the present disclosure.

The motor vehicle 5 includes a control system 36. The control system 36 may include a transmission control module, an engine control module, or a hybrid control module, or any other type of controller. The control system 36 may include one or more electronic control devices having a pre-programmed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid, for example, from a pump 50, to the clutches/brakes 34 that engages the clutches/brakes 34. The control module 36 is also in communication with a plurality of sensors located throughout the motor vehicle 5. For example, the control module 36 communicates with engine speed and temperature sensors 37A and 37B, a brake pedal position sensor 37C, an ignition key sensor 37D, a vehicle speed sensor 37E, to name but a few.

Figure 2:
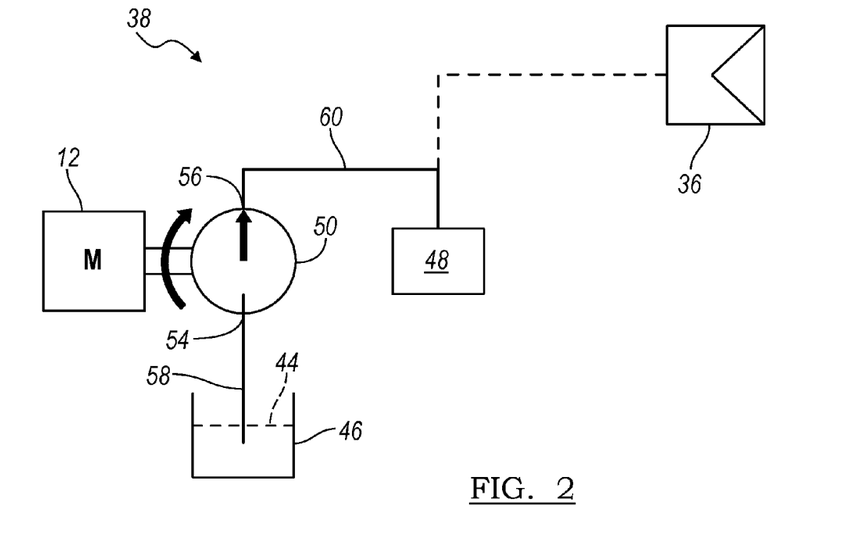
FIG. 2 is a schematic diagram of a portion of an exemplary hydraulic control system in accordance with the principles of the present invention.

Turning to FIG. 2, a portion of the hydraulic control system 38 is illustrated. The portion of the hydraulic control system 38 shown in FIG. 2 is exemplary and other configurations may alternatively be employed. The hydraulic control system 38 is operable to selectively engage the clutches/brakes 34 by selectively communicating a hydraulic fluid 44, such as automatic transmission fluid, from a sump 46 to a clutch actuation circuit 48. The controller 36 may control the hydraulic control system 38, by way of example. The clutch actuation circuit 48 includes clutch control solenoids, valves, and actuators operable to engage the plurality of clutches/brakes 34. The hydraulic fluid 44 is communicated to the clutch actuation circuit 48 under pressure from either a pump 50, which is driven by the engine 12, or an accumulator circuit (not shown).

The sump 46 is a tank or reservoir to which the hydraulic fluid 44 returns and collects from various components and regions of the automatic transmission 14. The hydraulic fluid 44 is forced from the sump 46 and communicated throughout the hydraulic control system 38 via the pump 50. The pump 50 may be, for example, a gear pump, a vane pump, a gerotor pump, or any other positive displacement pump. The pump 50 includes an inlet port 54 and an outlet port 56. The inlet port 54 communicates with the sump 46 via a suction line 58. The outlet port 56 communicates pressurized hydraulic fluid 44 to a main line pressure circuit 60. The main line pressure circuit 60 may include various optional features including, for example, a spring biased blow-off safety valve, a pressure side filter, or a spring biased check valve.

The main line pressure circuit 60 communicates with the clutch actuation circuit 48, and the main line pressure circuit 60 may also communicate with an optional accumulator circuit (not shown). The optional accumulator circuit may include an accumulator, a solenoid, a pressure sensor or estimator, a volume sensor, and/or a position sensor. An example of an accumulator for use with the present invention is disclosed in commonly assigned U.S. patent application Ser. No. 12/635,587 filed Dec. 10, 2009, published as 2011-0139285 hereby incorporated by reference as if fully disclosed herein.

Figure 3:
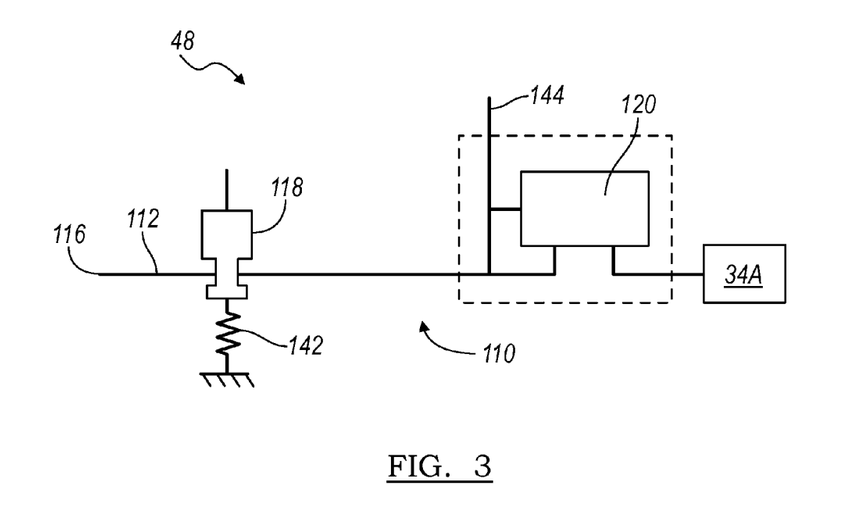
FIG. 3 is a schematic diagram of a variation of a latching clutch control system, according to the principles of the present invention.

Referring to FIG. 3, a portion of the clutch actuation circuit 48 is illustrated. The clutch actuation circuit 48 may include a latching clutch control system 110, which is an example of a latching clutch control system 110 in accordance with the invention, but any other latching system may be used without falling beyond the spirit and scope of the present invention.

The latching clutch control system 110 includes a clutch feed channel 112. When a torque transmitting mechanism 34A, one of the clutches/brakes 34 described above, is engaged, hydraulic fluid is fed into an inlet 116 of the clutch feed channel 112. The hydraulic fluid then travels past a clutch feed valve 118, for example, such as a poppet valve, through a latching valve 120, and into the torque transmitting mechanism 34A. The clutch feed valve 118 is normally open, in this embodiment.

In this embodiment, the latching valve 120 is activated by a pressure higher than the normal operating pressure of the latching valve 120; however, other variations of latching valves 120 could alternatively be used without falling beyond the spirit and scope of the present disclosure.

In this example, the latching valve 120 latches (closes) and holds fluid within the clutch cavity of the torque transmitting mechanism 34A when the fluid pressure of the hydraulic fluid entering the latching valve 120 through the clutch feed channel 112 exceeds a predetermined threshold. The predetermined threshold may be, for example, about 2000 kPa. In some instances, the latching valve 120 may be enabled to latch fluid within the clutch cavity of the torque transmitting mechanism 34A when the fluid pressure is at between about 1 and 10 bars higher than fluid is being fed normally to the clutch cavity of the torque transmitting mechanism 34A. If the pressure in the clutch feed line 112 is reduced to zero, such as when the hydraulic feed to the torque transmitting mechanism 34A is off, the latching valve 120 may be released by exerting a fluid pressure on the latching valve 120, by way of example. For example, a fluid pressure of between about 1 and 10 bars of fluid pressure may be exerted on the latching valve 120 to release the latching valve 120. In another variation, a fluid pressure of about 200-300 kPa may be exerted on the latching valve 120 to release the latching valve 120. Accordingly, the latching valve 120 latches and unlatches by applying fluid pressure to the latching valve 120 that is above the torque transmitting mechanism's 34A normal operating pressure, by way of example. A valve sold by LuK may be implemented as the latching valve 120.

Referring to FIGS. 1-3, when the motor vehicle 5 stops (i.e., at a red light for example), shutting off the engine 12 may be desirable in order to improve fuel economy. However, during an automatic engine stop event, the engine 12 is shut down, which ordinarily causes a loss of hydraulic fluid 44 pressure in the transmission hydraulic circuit and clutches. Trapping some or all of the hydraulic fluid of the clutch cavity within the clutch cavity of the torque transmitting mechanism 34A may eliminate delay with running the transmission 14 upon restart of the engine 12. Accordingly, the latching valve 120 latches fluid within the clutch cavity of the torque transmitting mechanism 34A, even when the engine 12 is turned off. Therefore, when the engine 12 is restarted, the torque transmitting mechanism 34A is ready to operate with little delay time because the torque transmitting mechanism 34A is already filled with hydraulic fluid.

In some situations, however, unlatching the latching valve 120 and the clutch cavity of the torque transmitting mechanism 34A is desirable to disengage and drain the torque transmitting mechanism 34A. For example, if the vehicle 5 is stopped at a light, but the driver decides to travel in reverse, fluid should be drained from the clutch cavity of the torque transmitting mechanism 34A to disengage the torque transmitting mechanism 34A, in order to achieve another gear state that may include the "reverse" gear state. For example, the torque transmitting mechanism 34A may need to be drained if the torque transmitting mechanism 34A is configured for engaging the vehicle 5 in drive, but not in reverse. In other situations, unlatching the torque transmitting mechanism 34A may facilitate faster shift times, or other scenarios could need the torque transmitting mechanism 34A to be drained. To release hydraulic fluid from the torque transmitting mechanism 34A, the latching valve 120 must be opened, however, if the engine is off or if the torque transmitting mechanism 34A is not in use, no fluid pressure is being applied to the torque transmitting mechanism 34A through the clutch feed line 112. As such, the fluid pressure needed to open the latching valve 120 is unavailable from the clutch feed line 112, but fluid may be supplied via another control line, such as an auxiliary unlatch fluid line 144.

Upon the unlatching of the latching valve 120, the latching valve 120 is opened and the fluid in the clutch cavity of the torque transmitting mechanism 34A is released to the unlatch fluid line 144 and/or the clutch feed line 112 and to the sump 46. The latching valve 120 needs only to be pressurized for a short period of time to latch or unlatch, for example, in the range of about one millisecond to about one second, or another transient period of time.

The latching clutch control system 110 may also include software, for example, in the control system 36 (FIG. 2), to monitor the vehicle conditions and determine if the latching valve 120 should be latched or unlatched. The latching valve 120 may be enabled or disabled either by the clutch feed fluid through the clutch feed line 112 or the auxiliary unlatch fluid line 144.

Figure 4:
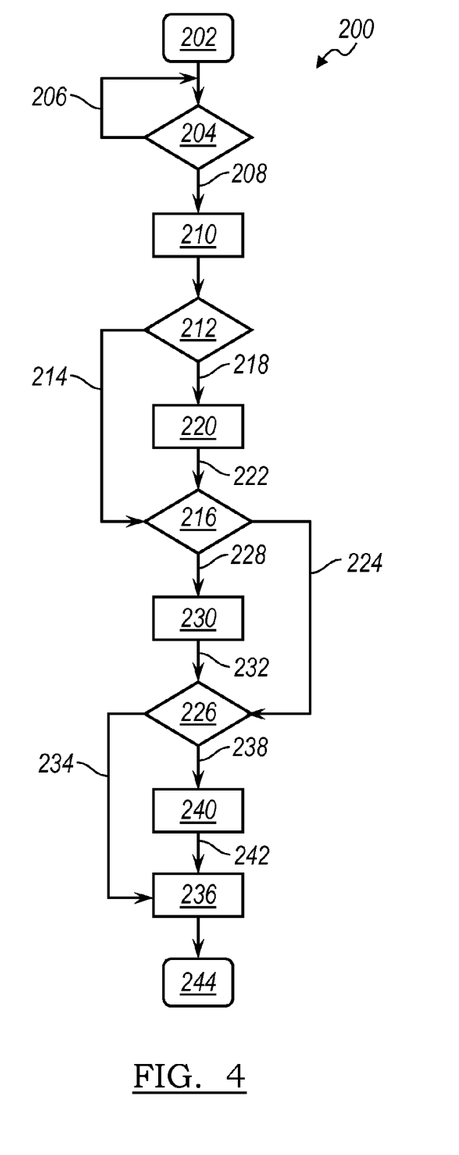
FIG. 4 is a block diagram illustrating a method of operating the motor vehicle of FIGS. 1-2 according to the principles of the present invention.

When the motor vehicle 5 stops (i.e., at a red light for example), the control system 36 or other controller may automatically shut off the engine 12 in order to improve fuel economy. A method and control system for controlling the engine stop-start are illustrated in FIG. 4 and generally designated at 200. The method 200 starts at block 202.

The method 200 uses various information to determine whether an automatic stop-start should be implemented. For example, in step 204, the method 200 includes determining whether conditions are met for an autostop. Various parameters may be considered to make such a determination. These parameters include, but are not limited to, the following: vehicle speed, gear state or transmission ratio state, ambient temperature, automatic transmission fluid (ATF) temperature, and/or battery state. For example, if vehicle speed is above a predetermined threshold, the system will determine that conditions are not met for an autostop, in step 204. The predetermined threshold for vehicle speed may be, for example, 5 kph. Regarding gear state, the system may determine whether the vehicle is in a desired gear state for an autostop. In some embodiments, first gear and/or second gear may be appropriate gear states for an autostop to occur. Regarding ambient temperature and ATF temperature, the system may determine whether these temperatures are in predetermined desired ranges for an autostop. With regard to battery state, the system may determine whether the battery in a hybrid is appropriately charged (in a predetermined threshold range) for an autostop to be desirable. In one variation, with regard to battery state, the system may determine whether a battery in a non-hybrid is charged within a predetermined desired threshold range.

If the conditions are not met in step 204 for an autostop, based on the various parameters being considered, the method follows a path 206 to inquire again in step 204 whether the conditions for an autostop are met. The path 206 may include a continuous or constant inquiry of whether the conditions for an autostop are met, or in the alternative, the step 204 may only be executed when the system receives a command to engage in an autostop.

If the system determines that the conditions for an autostop are met in step 204, then the method 200 follows a path 208 to a step 210. In step 210, a message is sent to an appropriate controller, which may be part of the control system 36, to allow autostops. In other words, the message states that the transmission is ready for autostops. The message may be sent via a controller area network (CAN) signal, in one variation, though any other type of transmission is also acceptable.

The method 200 then continues to a step 212, where the system determines whether a high enough line pressure can be obtained from the pump 50 to bring the clutch feed line 112 pressure above a predetermined threshold (such as about 2000 kPa) to latch the latching valve 120. If the system determines that that a sufficiently high line pressure can be obtained from the pump 50 to latch the latching valve 120 and/or that the engine is operating in the desired RPM range, then the method 200 follows a path 214 to a step 216, which will be described below. On the other hand, if in step 212 the system determines that the pump 50 will not be able to provide a sufficient line pressure to latch the latching valve 120, the method 200 follows a path 218 to a step 220. In step 220, the system sends an engine speed request to request that the engine increase the engine's revolutions per minutes (RPMs), in order to increase line pressure. Thereafter, the method 200 follows a path 222 to step 216. Thus, step 216 can be arrived at via path 214 or 222.

In step 216, the system determines whether the line pressure command has been changed to increase line pressure or to change line pressure to a desired range. The step 216 may include determining whether line pressure is in the desired pressure range. If the line pressure command has already been changed to increase line pressure and/or to change line pressure to the desired range, the method 200 follows a path 224 to a step 226, which will be described below. On the other hand, if in step 216 the system determines that the line pressure command has not been updated to increase line pressure and/or to change line pressure to a desired level, the method 200 follows a path 228 to a step 230. In step 230, the system changes the line pressure command to increase line pressure or to decrease line pressure to the desired range for latching the latching valve 120. Thereafter, the method 200 follows a path 232 to step 226. Thus, step 226 can be arrived at via path 224 or 232.

In step 226, the system determines whether the clutch pressure control command has been changed to increase clutch pressure, for example, in the clutch feed line 112 to latch the latching valve 120. If the clutch pressure control command has already been changed to increase clutch pressure, the method 200 follows a path 234 to a step 236, which will be described below. On the other hand, if in step 226 the system determines that the clutch pressure control command has not been updated to increase clutch control pressure, the method 200 follows a path 238 to a step 240. In step 240, the system changes the clutch pressure control command to increase or change the clutch pressure, for example, in clutch feed line 112. Thereafter, the method 200 follows a path 242 to step 236. Thus, step 236 can be arrived at via path 234 or 242.

In step 236, the system updates the latching mechanism status to "enable" (or the like). In some embodiments, step 236 involves first determining whether the latching valve 120 is latched before updating the status to "enable" (or the like). A sensor could be used to sense whether the latching valve 120 is latched, in one example. In another example, the system may observe the pressure conditions in the clutch feed line 112, or in another fluid line in communication with the latching valve 120 and/or the system may wait a predetermined amount of time after which the system may assume that the latching valve 120 has latched.

The method 200 then ends at a step 244 until the latching valve 120 is unlatched. When the latching valve 120 is unlatched, the method 200 may be immediately restarted at step 202, or in the alternative, the method 200 may be restarted after the conditions to allow autostops are met.

Figure 5:
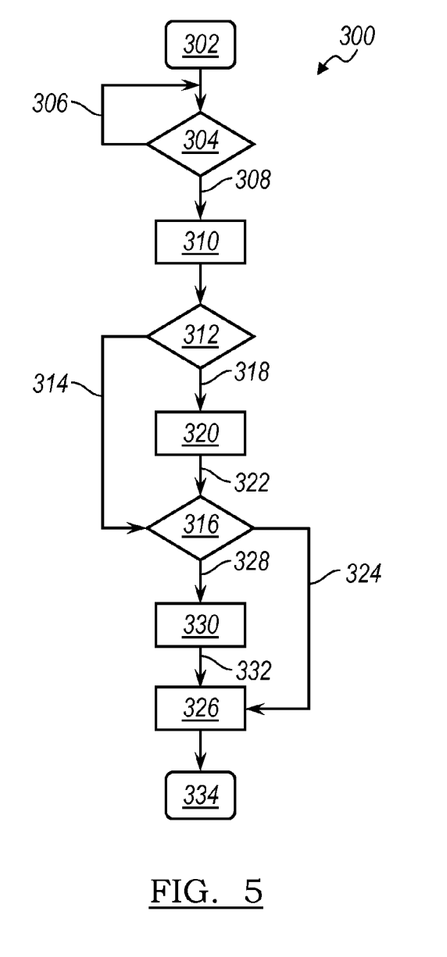
FIG. 5 is a block diagram illustrating a method of further operating the motor vehicle of FIGS. 1-2, in accordance with the principles of the present invention.

When an autostart is desired, pump pressure is directed to the torque transmitting mechanism used for launching the vehicle. Thus, another method and control system for controlling the engine restart system are illustrated in FIG. 5 and generally designated at 300. The method 300 starts at block 302. Examples of when unlatching is necessary include desire to shift to reverse during an autostop or when the engine is running and the valve is latched but current conditions make it undesirable to have an autostop.

Similar to the step 204 in the method 200 for autostopping the vehicle 5, the method 300 for autostarting the vehicle uses various information to determine whether conditions are still met for an autostop. For example, in step 304, the method 300 includes determining whether conditions are met for an autostop. Various parameters may be considered to make such a determination. These parameters include, but are not limited to, the following: vehicle speed, gear state or transmission ratio state, ambient temperature, automatic transmission fluid (ATF) temperature, and/or battery state. The details regarding these parameters are discussed above in conjunction with FIG. 4, and such discussion is herein incorporated by reference.

If the conditions are met in step 304 for an autostop, based on the various parameters being considered, the method 300 follows a path 306 to inquire again in step 304 whether the conditions for an autostop are met. The path 306 may include a continuous or constant inquiry of whether the conditions for an autostop are met, or in the alternative, the step 304 may only be executed when the system receives a command to restart the engine or end the autostop.

If the system determines that the conditions for an autostop are no longer met in step 304, then the method 300 follows a path 308 to a step 310. In step 310, a message is sent to an appropriate controller, which may be part of the control system 36, to inhibit autostops. In other words, the message states that the transmission is not ready for autostops. The message may be sent via a controller area network (CAN) signal, in one variation, though any other type of transmission is also acceptable.

The method 300 then continues to a step 312, where the system determines whether the line pressure command has been changed to increase line pressure or to change line pressure to a desired range, in order to unlatch the latching valve 120. For example, in some variations, the latching valve 120 may be unlatched by increasing line pressure from 100 kPa to about 200-300 kPa. If the line pressure command has already been changed to increase or change line pressure, the method 300 follows a path 314 to a step 316, which will be described below. On the other hand, if in step 312 the system determines that the line pressure command has not been updated to increase or change line pressure, the method 300 follows a path 318 to a step 320. In step 320, the system changes the line pressure command to increase or change line pressure to a predetermined desired range. Thereafter, the method 300 follows a path 322 to step 316. Thus, step 316 can be arrived at via path 314 or 322.

In step 316, the system determines whether the clutch pressure control command has been changed to increase or change clutch pressure, for example, in the clutch feed line 112 to unlatch the latching valve 120. If the clutch pressure control command has already been changed to increase clutch pressure, the method 300 follows a path 324 to a step 326, which will be described below. On the other hand, if in step 316 the system determines that the clutch pressure control command has not been updated to increase or change clutch control pressure, the method 300 follows a path 328 to a step 330. In step 330, the system changes the clutch pressure control command to increase or change the clutch pressure, for example, in clutch feed line 112. Thereafter, the method 300 follows a path 332 to step 326. Thus, step 326 can be arrived at via path 324 or 332.

In step 326, the system updates the latching mechanism status to "disable" (or the like). In some embodiments, step 326 involves first determining whether the latching valve 120 is unlatched before updating the status to "disable" (or the like). A sensor could be used to sense whether the latching valve 120 is unlatched, in one example. In another example, the system may observe the pressure conditions in the clutch feed line 112, or in another fluid line in communication with the latching valve 120 and/or the system may wait a predetermined amount of time after which the system may assume that the latching valve 120 has been unlatched. The method 300 then ends at a step 334 until the method 200 begins again and latches the latching valve 120. When the latching valve 120 is latched again, the method 300 may be immediately restarted at step 302, or in the alternative, the method 300 may be restarted after a request for an engine restart or a request to end the autostop is made.

The description of the invention is merely exemplary in nature and variations that do not depart from the gist of the invention are intended to be within the scope of the invention. Such variations are not to be regarded as a departure from the spirit and scope of the invention. In addition, it should be understand that the system and method disclosed herein could incorporate various elements and features that are described throughout the present disclosure, as well as equivalents, without departing from the spirit and scope of the present invention.

What is claimed is:

1. A method of controlling a hydraulic system of a vehicle powertrain having an engine and a transmission, the method comprising:
   determining whether conditions are met for an autostop;
   determining that a predetermined minimum amount of line pressure is available from a pump to latch a latching valve if it is determined that the conditions are met for the autostop;
   determining that line pressure is at or above the predetermined minimum amount of line pressure to latch the latching valve if it is determined that the minimum amount of line pressure is available from the pump;
   determining that clutch pressure has been increased to a predetermined minimum amount of clutch pressure to latch the latching valve if it is determined that the line pressure is at or above the predetermined minimum amount of line pressure; and
   updating a latch status to indicate that the latching valve is enabled if it is determined that clutch pressure has been increased to the predetermined minimum amount.

2. The method of claim 1, further comprising sending a message to an appropriate controller to allow autostops if the conditions are met for the autostop.

3. The method of claim 2, wherein the step of determining whether the conditions are met for the autostop includes at least one of the following: determining that a vehicle speed is below a predetermined threshold, determining that a transmission ratio state is in a predetermined desired gear ratio, determining that an ambient temperature is in a predetermined ambient temperature range, determining that an automatic transmission fluid temperature is in a predetermined automatic transmission fluid temperature range, and determining that a battery of the vehicle is charged above a predetermined threshold.

4. The method of claim 3, wherein the step of determining whether the conditions are met for the autostop includes each of the following: determining that the vehicle speed is below the predetermined threshold, determining that the transmission ratio state is in the predetermined desired gear ratio, determining that the ambient temperature is in the predetermined ambient temperature range, determining that the automatic transmission fluid temperature is in the predetermined automatic transmission fluid temperature range, and determining that the battery of the vehicle is charged above the predetermined threshold.

5. The method of claim 4, further comprising sending an engine speed request signal to request that the engine increases the engine speed to increase the line pressure if the line pressure is below the predetermined minimum amount of line pressure.

6. The method of claim 5, further comprising determining that a line pressure command has been changed to bring line pressure to at least the predetermined minimum amount of line pressure if it is determined that the minimum amount of line pressure is available from the pump, wherein the predetermined minimum amount of line pressure is high enough to latch the latching valve.

7. The method of claim 6, further comprising determining that a clutch pressure command has been changed to bring the clutch pressure to at least the predetermined minimum amount of clutch pressure if the line pressure command has been changed to bring line pressure to at least the predetermined minimum amount of line pressure, wherein the predetermined minimum amount of clutch pressure is high enough to latch the latching valve.

8. The method of claim 7, further comprising determining that the latching valve is latched, if the clutch pressure control command has already been changed to increase clutch pressure.

9. The method of claim 8, further comprising sending a message to an appropriate controller to inhibit autostops if the conditions are not met for the autostop.

10. The method of claim 9, further comprising:
determining that line pressure is above a predetermined minimum value to unlatch the latching valve, if the latching valve has been latched;
determining that clutch pressure has been increased to a predetermined minimum to unlatch the latching valve, if the line pressure is above the predetermined minimum value to unlatch the latching valve; and
updating a latch status to indicate that the latching valve is disabled, if the clutch pressure has been increased to the predetermined minimum to unlatch the latching valve.

11. A hydraulic fluid latching system for a torque transmitting device of a transmission of a motor vehicle having an engine, the hydraulic fluid latching system comprising:
a clutch feed channel configured to provide hydraulic fluid from a pressurized source to a torque transmitting device when the torque transmitting device is engaged and the engine is running;
a latching valve connecting the clutch feed channel to the torque transmitting device, the latching valve configured to selectively trap pressurized hydraulic fluid within the torque transmitting device; and a control system comprising:
a first control logic configured to determine whether conditions are met for an autostop;
a second control logic configured to determine that a predetermined minimum amount of line pressure is available from a pump to latch the latching valve if the conditions are met for the autostop;
a third control logic configured to determine that line pressure is above the predetermined minimum amount of line pressure to latch the latching valve if the predetermined minimum amount of line pressure is available from the pump to latch the latching valve;
a fourth control logic configured to determine that clutch pressure has been increased to a predetermined minimum amount of clutch pressure to latch the latching valve if the line pressure is above the predetermined minimum amount of line pressure to latch the latching; and
a fifth control logic configured to update a latch status to indicate that the latching valve is enabled if the clutch pressure has been increased to the predetermined minimum amount of clutch pressure to latch the latching valve.

12. The hydraulic fluid latching system claim 11, wherein the control system further comprises:
a sixth control logic configured to send a message to allow autostops if the conditions are met for the autostop;
a seventh control logic configured to send an engine speed request signal to request that the engine increase the engine's speed to increase line pressure if the line pressure is below the predetermined minimum amount of line pressure; and
an eighth control logic configured to determine that a line pressure command has been changed to bring the line pressure to at least the predetermined minimum amount of line pressure, wherein the predetermined minimum amount of line pressure is high enough to latch the latching valve.

13. The hydraulic fluid latching system of claim 12, wherein the control system further comprises:
a ninth control logic configured to determine that the clutch pressure command has been changed to bring the clutch pressure to at least the predetermined minimum amount of clutch pressure if the line pressure command has been changed to bring the line pressure to at least the predetermined minimum amount of line pressure, wherein the predetermined minimum amount of clutch pressure is high enough to latch the latching valve; and
a tenth control logic configured to determine that the latching valve is latched if the clutch pressure command has been changed to bring the clutch pressure to at least the predetermined minimum amount of clutch pressure.

14. The hydraulic fluid latching system of claim 13, the clutch feed channel having an inlet portion and a clutch portion, the hydraulic fluid latching system further comprising an inlet valve connecting the inlet portion to the clutch portion, the clutch portion being in communication with the latching valve, the inlet portion being in communication with a source of pressurized hydraulic fluid, wherein the inlet valve is normally open to allow pressurized hydraulic fluid to flow from the inlet portion to the clutch portion when the torque transmitting device is engaged, the hydraulic fluid latching system being configured to close the inlet valve to unlatch the latching valve.

15. The hydraulic fluid latching system of claim 14, wherein the control system further comprises:
an eleventh control logic configured to send a message to an appropriate controller to inhibit autostops if the conditions are not met for the autostop;
a twelfth control logic configured to determine that line pressure is above a predetermined minimum value to unlatch the latching valve, if the latching valve has been latched;
a thirteenth control logic configured to determine that clutch pressure has been increased to a predetermined minimum to unlatch the latching valve, if the line pressure is above the predetermined minimum value to unlatch the latching valve; and
a fourteenth control logic configured to update a latch status to indicate that the latching valve is disabled if the clutch pressure has been increased to the predetermined minimum to unlatch the latching valve.

16. A method of controlling a hydraulic system of a vehicle powertrain having an engine and a transmission, the method comprising:
determining whether conditions are met for an autostop;
sending a message to inhibit autostops if the conditions are not met for the autostop;
determining whether a line pressure command has been changed to increase line pressure to at least a predetermined threshold, and if not, changing the line pressure command to increase line pressure to at least the predetermined threshold;

determining whether a clutch pressure control command has been increased to a predetermined minimum to unlatch a latching valve, and if not, changing the clutch pressure control command to increase clutch pressure to at least the predetermined minimum; and updating a latch status to indicate that the latching valve is disabled.

17. The method of claim 16, wherein the step of determining whether conditions are met for an autostop includes at least one of the following: determining that vehicle speed is below a predetermined threshold, determining that a transmission ratio state is in a predetermined desired gear ratio, determining that ambient temperature is in a predetermined ambient temperature range, determining that automatic transmission fluid temperature is in a predetermined automatic transmission fluid temperature range, and determining that a vehicle battery is charged above a predetermined threshold.

18. The method of claim 17, wherein the step of determining whether the conditions are met for the autostop includes each of the following: determining that the vehicle speed is below the predetermined threshold, determining that the transmission ratio state is in the predetermined desired gear ratio, determining that the ambient temperature is in the predetermined ambient temperature range, determining that the automatic transmission fluid temperature is in the predetermined automatic transmission fluid temperature range, and determining that the vehicle battery is charged above the predetermined threshold.

19. The method of claim 18, further comprising sensing that the latching valve is disabled.

* * * * *